United States Patent [19]
Ueno et al.

[11] Patent Number: 5,356,535
[45] Date of Patent: Oct. 18, 1994

[54] OIL TANK

[75] Inventors: Hiroshi Ueno, Osaka; Hirokazu Arai, Nara; Yoshiaki Hamasaki, Nara; Akihiko Shiina, Nara; Masuyoshi Uchida, Nara; Seiji Fujioka, Osaka, all of Japan

[73] Assignee: Koyo Seiko Co., Ltd., Osaka, Japan

[21] Appl. No.: 937,396

[22] Filed: Aug. 31, 1992

[30] Foreign Application Priority Data

Sep. 4, 1991 [JP] Japan ................. 3-254815
Sep. 12, 1991 [JP] Japan ................. 3-082300[U]
Nov. 27, 1991 [JP] Japan ................. 3-105849[U9

[51] Int. Cl.$^5$ ............................................. B01D 29/00
[52] U.S. Cl. ............................... 210/416.5; 137/574;
210/256; 210/335; 210/428; 210/443; 210/456
[58] Field of Search ............... 210/416.5, 168, 172,
210/171, 256, 323.1, 335, 428, 443, 456;
137/574, 575

[56] References Cited

U.S. PATENT DOCUMENTS

| Re. 32,620 | 3/1988 | Iwai | 123/195 P |
|---|---|---|---|
| 2,767,736 | 10/1956 | Lackinger | 137/574 |
| 4,210,176 | 7/1980 | Emming | 137/573 |
| 4,212,739 | 7/1980 | Hilton et al. | 210/232 |
| 4,241,578 | 12/1980 | Keene | 60/478 |
| 4,424,829 | 1/1984 | Millmgton | 137/590 |
| 4,431,027 | 2/1984 | Sabina, Jr. | 137/574 |
| 4,522,166 | 6/1985 | Toivio et al. | 210/168 |
| 4,809,745 | 3/1989 | Hörmann | 137/574 |
| 4,861,467 | 8/1989 | Fukuhara | 210/416.5 |
| 5,051,116 | 9/1991 | Mattsson | 95/260 |
| 5,087,179 | 2/1992 | Nyui et al. | 210/232 |

FOREIGN PATENT DOCUMENTS

| 271702 | 6/1988 | European Pat. Off. . |
|---|---|---|
| 2242581 | 3/1975 | Fed. Rep. of Germany . |
| 3206965 | 9/1983 | Fed. Rep. of Germany . |
| 8608045 | 5/1986 | Fed. Rep. of Germany . |
| 55-6039 | 2/1980 | Japan . |
| 59-190502 | 10/1984 | Japan . |
| 61-35761 | 10/1986 | Japan . |
| 62-21123 | 5/1987 | Japan . |
| 62-34573 | 9/1987 | Japan . |
| 63-90063 | 6/1988 | Japan . |
| 1-10484 | 3/1989 | Japan . |
| 8908783 | 9/1989 | Sweden . |
| 1463334 | 2/1977 | United Kingdom . |

*Primary Examiner*—Virginia Manoharan
*Attorney, Agent, or Firm*—Mason, Fenwick & Lawrence

[57] ABSTRACT

An oil tank including an oil tank body for storing oil and an oil filter disposed between an oil inlet for allowing oil into the oil tank body and an oil outlet for sending oil out. An oil inlet chamber is formed, inside the oil tank body, from a portion of the side wall, a portion of the bottom wall and the inner wall of the tank body, and communicates with the oil inlet. The oil filter has a substantially flat shape and forms a portion of the inner wall. By the use of the oil filter having a reasonably large mesh area, independently of the diameter of the oil inlet, the oil filter is protected against a mesh damage and is prevented from being detached. Since no excessively large area mesh is required, no particular rise in material costs is expected. A substantially flat surface structured oil filter is easy to fabricate and less costly to fabricate as well.

9 Claims, 30 Drawing Sheets

"Prior Art"

"Prior Art"

"Prior Art"

OIL TANK

FIELD OF THE INVENTION

The present invention relates to an oil tank, for example the oil tank is disposed in a hydraulic circuit for a hydraulic power steering device.

DESCRIPTION OF THE RELATED ART

FIG. 28 is a cross-sectional view showing the bottom portion of a conventional oil tank. In FIG. 28, the oil tank comprises an oil tank body 101 for storing oil, an inlet pipe 103 serving as an oil inlet 102 through which oil is allowed into the oil tank body 101, and an outlet 105 through which oil is sent out. The inlet 102 is provided with a cylindrical oil filter 104 for filtering oil streaming into the tank body 101. The oil filter 104 is fixed in a manner that the inlet pipe 103 is inserted into the oil filter 104.

In the above-described cylindrical oil filter 104, the mesh area of the filter element 104a depends on the diameter of the inlet pipe 103 of the oil inlet 102; thus, a difficulty is presented in assuring a sufficiently large mesh area. As a result of limited mesh area, oil passage suffers resistance therethrough, occasionally forcing the oil filter 104 out of engagement with the inlet pipe 103 or breaking the mesh. A cylindrically formed mesh, constituting the filter element 104a, is interposed between an outer frame 104b and an inner frame (omitted from the figure) to form the cylindrical oil filter 104. Its forming process is thus complex, resulting high manufacturing cost.

Japanese Examined Utility Model Publications HEI No. 1-10484, SYO No. 62-21123, and Japanese Unexamined Patent Publication SYO No. 59-190502 disclose an oil tank which has, inside its structure, a chamber communicating with an oil inlet or oil outlet, the chamber having an side circular wall formed of a cylindrical oil filter. In these disclosures, an oil filter is provided with a sufficiently large mesh area. However a cylindrical oil filter is complex to form, and thus costly to fabricate.

Japanese Examined Utility Model Publications SYO No. 61-35761 and No. 62-34573 disclose an oil tank which has, inside its structure, a chamber communicating with an oil outlet, the chamber having an upper wall consisted of an oil filter which has a flat shape. In these disclosures, an oil filter is provided with a sufficiently large mesh area. However, the chamber communicates with the oil outlet rather than an oil inlet; thus, if both the volume of the chamber and the mesh area of the chamber are small, the flow rate of oil exiting out of the outlet is greater than the flow rate of oil entering into the tank through the filter. This allows air bubble to be mixed with oil, presenting a source of cavitation or noise in a pump, in case of the oil tank disposed in a hydraulic circuit. In conventional oil tanks, therefore, most area of the bottom wall of the tank structure constitutes the chamber so that the volume of the chamber is increased, and the mesh area of the oil filter is enlarged such that it is almost as large as the horizontal cross-section of the tank. However, enlarging the mesh area of the oil filter is costly.

To achieve a light-weighted design, the entire tank body is made of synthetic resin. In this case, the tank body is made of an upper member and a lower member, both of which are welded to each other for a singly body. FIG. 29 and FIG. 30 show the cross-sectional views of a conventional welding structure, in which a circular fusing area 110 is formed in either of the upper and lower members 101A, 101B, both of which constitutes the tank body. As shown in FIG. 29, the upper member 101A and the lower member 101B are pressed to each other on the fusing area 110, then both members 101A, 101B are subjected to a vibration welding in which both the upper and lower members 101A, 101B are horizontally vibrated with each other, or subjected to an ultrasonic welding in which a vertically oscillating ultrasonic vibration is applied to both the upper and lower members 101A, 101B. Such a welding operation fuses the fusing area 110, causing the upper and lower members 101A, 101B to be connected as shown in FIG.30.

However the above-described welding structure, occasionally suffered a relative sideway shifting between the upper and lower members 101A, 101B in the course of welding operation. Furthermore, burrs which sometimes took place on the inner welded portions happened to mix with the content of the tank.

Japanese Unexamined Utility Model Publication SYO No. 63-90063 discloses a welding structure in which a cavity is formed along inside the fusing area, in an attempt to prevent burrs from entering into an engine inlet surge tank, in the course of vibration welding of synthetic resin upper and lower members, which make up the tank. However the welding structure described in the disclosure, is still incapable of preventing a relative sideway shifting between the upper and lower members of the tank.

Japanese Examined Patent Publication SYO No. 55-6039 describes another welding structure in which an elastic material member is interposed between both a pair of members which are subjected to a vibration welding, with a burr receiving cavity disposed outside the welding area, so that the sealing of the welded portion is improved and so that burrs are prevented from entering the tank. However, this welding structure suffers a relative sideway shifting between the pair of members to be welded.

It is an object of the present invention to provide an oil tank which overcomes the above-described problems.

SUMMARY OF THE INVENTION

The oil tank of the present invention has an oil tank body for storing oil, and an oil filter disposed between an oil inlet for allowing oil into the oil tank body and an oil outlet for sending oil out, wherein the oil tank comprises an oil inlet chamber which is formed inside the oil tank body, the oil inlet chamber is enclosed by a portion of the side wall, a portion of the bottom wall and the inner wall of the tank body, and the oil inlet chamber communicates with the oil inlet, whereby the oil filter has a substantially flat shape and forms a portion of the inner wall. By forming the oil inlet chamber which communicates with the oil inlet, with a portion of the side wall, a portion of bottom wall and inner wall, the mesh area of the oil filter which makes up a portion of the inner wall is made sufficiently large, independently of the diameter of the oil inlet. The sufficient large mesh area of the oil filter reduces resistance oil suffers in its passage therethrough, thereby preventing the mesh of the oil filter from damaging and preventing the oil filter being detached off. Since the oil inlet chamber directly communicates with the oil inlet, no excessively large area mesh is required, and thus no additional rise in material costs is expected. Since the oil filter makes up a portion of the inner wall of the oil inlet chamber, the oil filter may be configured to have a substantially flat shape. Compared to a cylindrical structured oil filter, the oil filter which has a substantially flat shape is easy and thus less costly to fabricate.

Preferably, the oil inlet chamber has, in it, a baffle which deflects the flow of oil streaming into the oil inlet chamber through the oil inlet. Alternatively, it is preferable that the frame of the filter checks the flow of oil streaming into the chamber through the oil inlet. By deflecting or checking the flow of oil streaming into the oil inlet chamber through the oil inlet with the baffle or the frame of the oil filter, the filter element of the oil filter is protected against a direct exposure to the flow of oil. Thus, the mesh of the filter element is free from a damage or clogging.

Preferably, the oil tank body has a synthetic resin upper member and a synthetic resin lower member, a circumference of the rim of the upper member and a circumference of the rim of the lower member are interfaced with each other with a minimum clearance required for vibration welding, a fusing area, formed at least on either the upper member or the lower member, is fused by a frictional heat resulting from relative transverse vibration, and, as a result of the fusion, the upper member is welded to the lower member. Thus, relative sideway shifting between the upper member and the lower member is avoided. Alternatively, the tank body has a synthetic resin upper member and a synthetic resin lower member, the upper member and the lower member are fitted with each other so that no substantial relative sideway shifting between the upper member and the lower member may take place, a fusing area, formed at least on either the upper member or lower member, is fused by a frictional heat resulting from a vertically oscillating ultrasonic vibration, and, as a result of the fusion, the upper member is welded to the lower member. Thus, a relative sideway shifting between the upper member and the lower member is avoided. Preferably, a circular cavity is formed close to the welding area of the upper member and the lower member in order to retain burrs generated in the course of welding. This prevents the burrs from entering into the oil tank. Preferably, the interface between a circumference of the rim of the upper member and a circumference of the rim of the lower member is disposed inside the welding area, and the circular cavity is disposed outside the welding area. This causes burrs to move outwardly rather than inwardly in the tank, and, thus prevents perfectly the burrs from entering into the tank. Preferably, a circular sealing member is interposed between the upper member and the lower member before welding both members. The addition of the sealing member enhance the sealing capability between the upper member and the lower member.

DETAILED DESCRIPTION OF THE PREFERRED EMBODIMENTS

Figure 1:
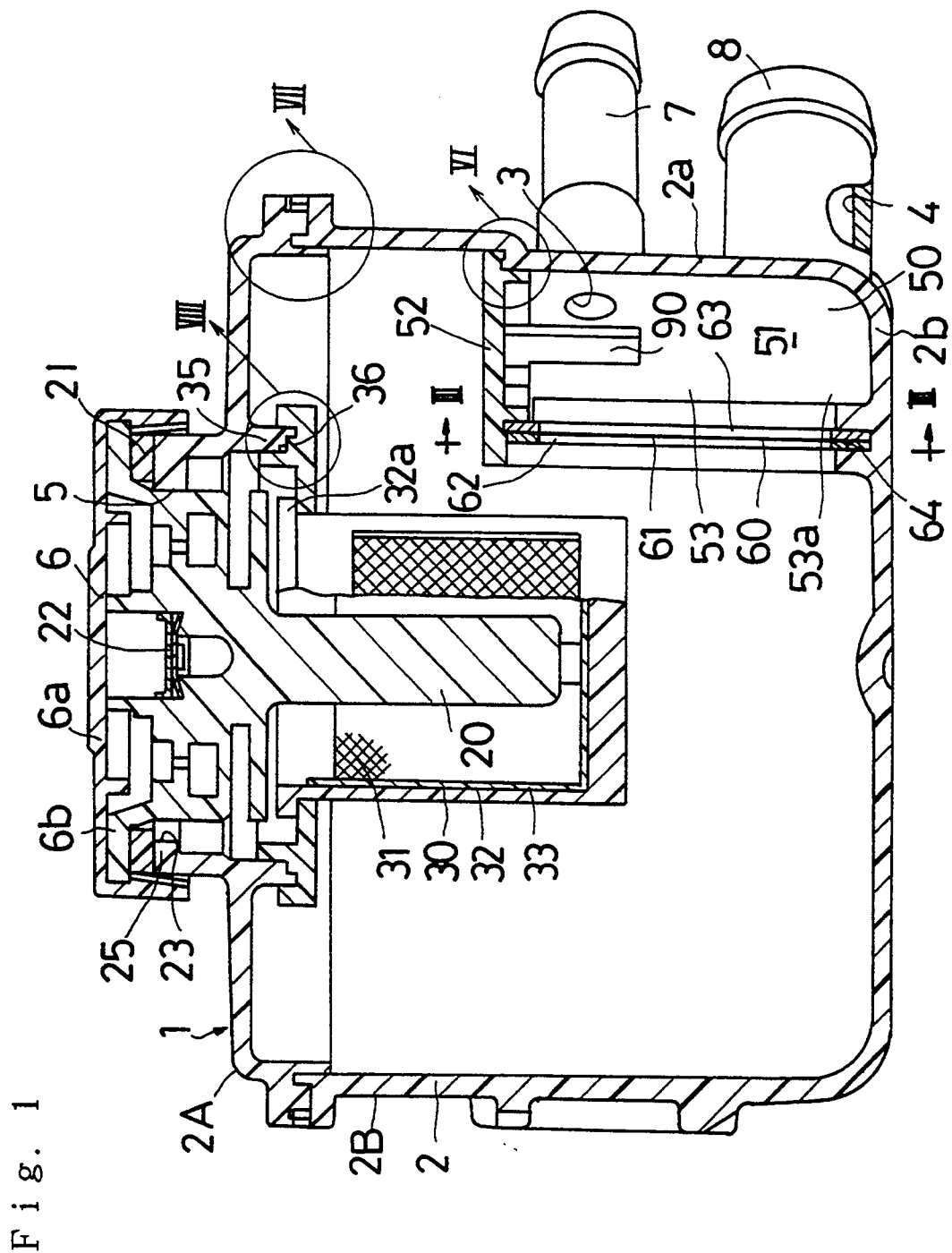
FIG. 1 is a cross-sectional view showing an embodiment of the oil tank according to the present invention.
Figure 2:
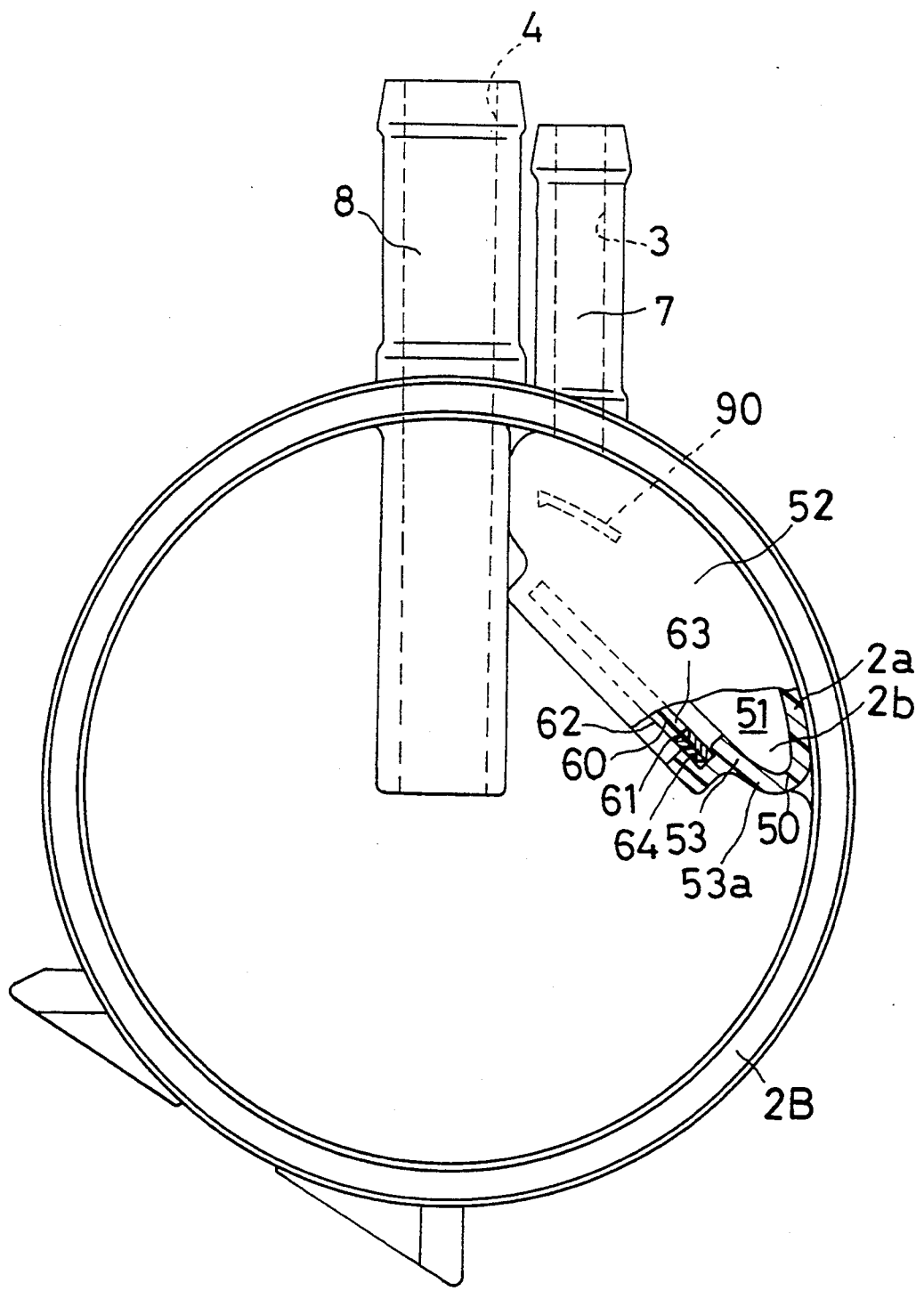
FIG. 2 is a plan view showing the lower member of an embodiment of the oil tank according to the present invention.

Referring now to the drawings, embodiments of the present invention is described below.

Indicated in FIG. 1 through FIG. 5 is an oil tank 1, which may be included, for example, in a hydraulic circuit of a hydraulic power steering device. The oil tank 1 comprises an oil tank body 2 for storing oil, a pipe 7 constituting an oil inlet 3 for allowing oil into the tank body 2, a pipe 8 constituting an oil outlet 4 for letting oil out of the tank body 2, an oil filter 60 disposed between the oil inlet 3 and the oil outlet 4, a cap 6 for opening or closing a filler opening 5 on the top of the tank body 2, and a oil filter 30 disposed between the filler opening 5 and the oil outlet 4.

Figure 7:
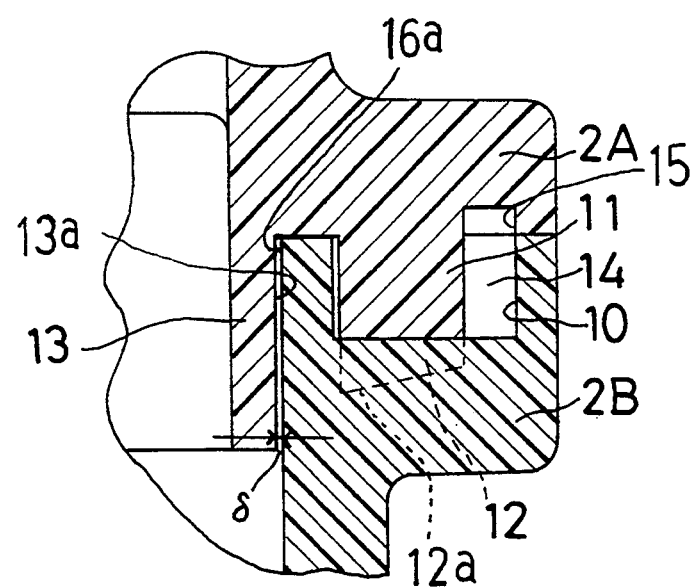
FIG. 7 is an enlarged view of section VII of FIG. 1.

The tank body 2, made of synthetic resin, is formed of an upper member 2A and a lower member 2B, both of which are welded to be together. The welding method employed is a vibration welding (also referred to as "friction welding"), wherein, with the upper member 2A and the lower member 2B held pressed with each other, one member is horizontally vibrated relative to the other member in a relatively low frequency. More specifically, the upper member 2A is welded to the lower member 2B as follows: as shown in FIG. 7, a circular groove 10 that is formed on the rim portion of the lower member 2B is engaged with a circular projected portion 11 formed on the rim of the upper member 2A; while a fusing area 12 formed on the projected portion 11, indicated by a dotted line in FIG. 7, is then pressed against part of the bottom area of the groove 10, a horizontal vibration is applied so that one member relatively moves with respect to the other; as a result, frictional heat develops, fusing the fusing area 12, and thus causing both members to be welded. In order to retain burrs generated in the process of vibration welding, a circular cavity 14 is formed, outside the welding area, of the outer circumference of the projected portion 11, the inner wall of the groove 10 and a groove 15 formed on the rim of the upper member 2A. Disposed inside the welding area is a circular edge 13 which is extended downward and which has the common inner surface as that of the upper member 2A. The edge 13 is mated with the rim portion of the lower member 2B in a manner that a minimum clearance δ required for vibration welding is allowed between the outer circumference 13a of the edge 13 and the inner surface 16a of the lower member 2B. Such an arrangement prevents a substantial sideway shifting between the upper member 2A and the lower member 2B in the course of welding operation. The bottom face 12a of the fusing area 12 slopes up outwardly along radial direction, in order to let burrs, generated in the course of welding operation, move into the cavity 14 positioned outside of the fusing area 12.

Figure 5:
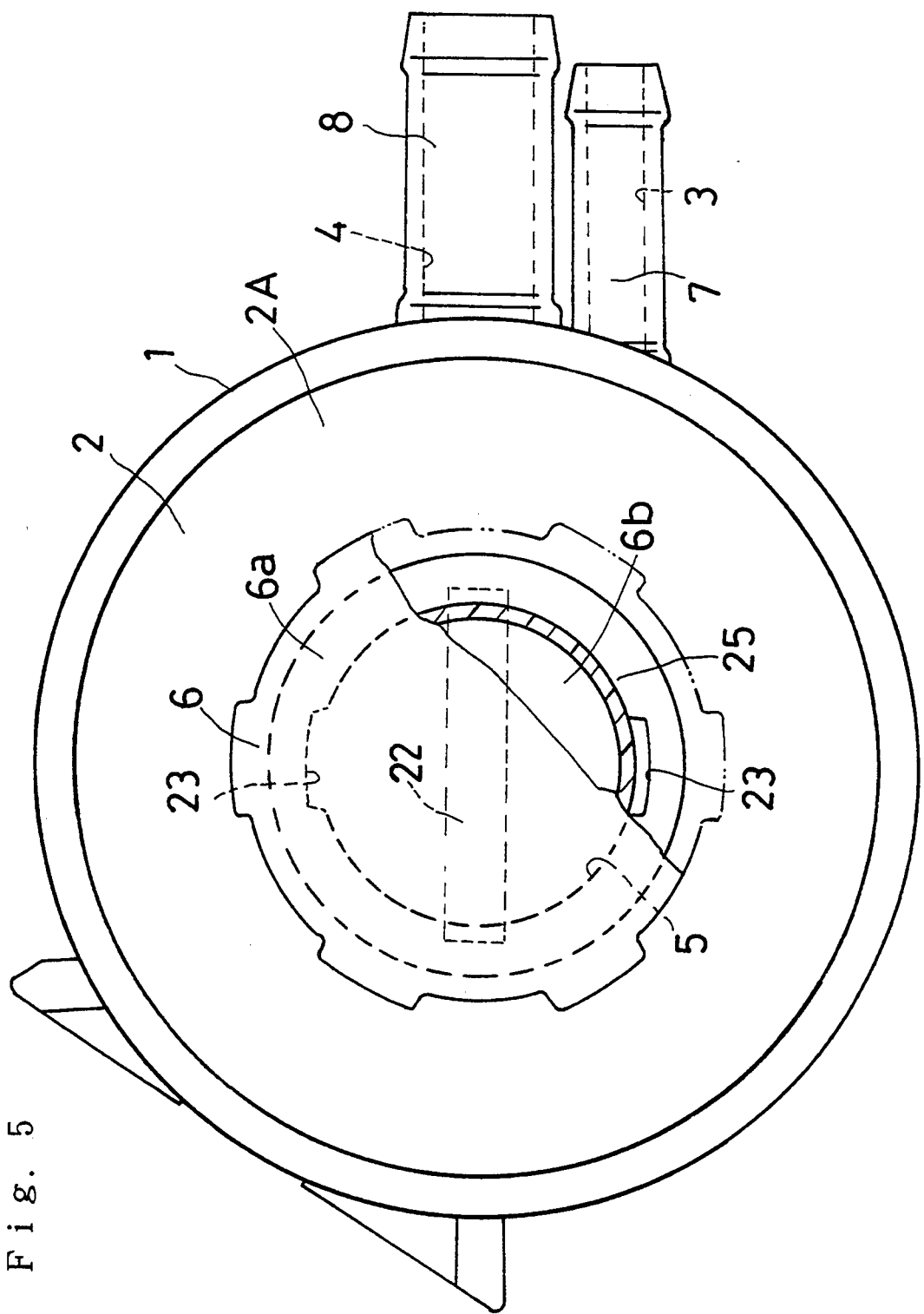
FIG. 5 is a plan view showing an embodiment of the oil tank according to the present invention.

As in FIG. 1 and FIG. 5, the cap 6 is formed by engaging an external ring member 6a with an internal ring member 6b. A level gage 20 is integrated into the internal ring member 6b. Also, a leaf spring 22 is mounted to the internal ring member 6b. The leaf spring 22 is inserted into the tank body 2, through cutouts 23 of an inwardly projecting flange 25 which surrounds the filler opening 5. When the cap 6 is rotated after the leaf spring 22 inserted into the tank body 2, the inwardly projecting flange 25 is pressed between the leaf spring 22 and the internal ring member 6b, thereby securing the cap 6. A sealing ring 21 is interposed between the internal ring member 6b and the inwardly projecting flange 25.

Figure 8:
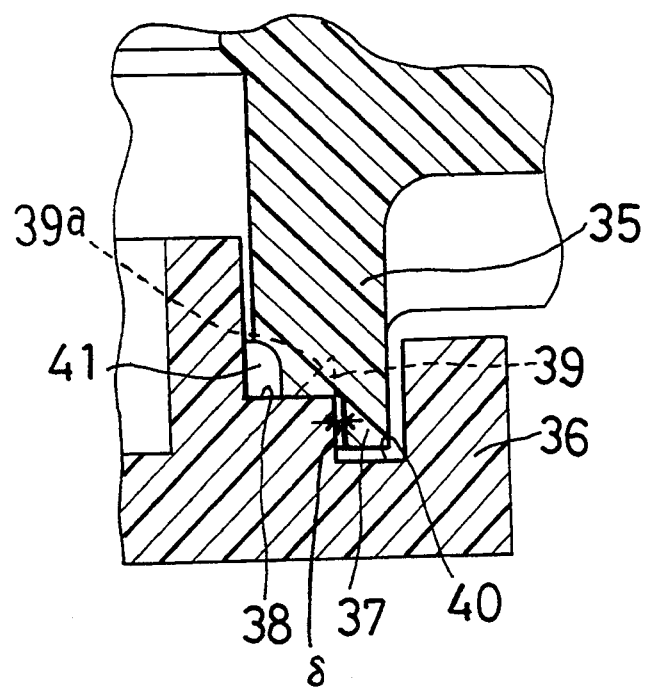
FIG. 8 is an enlarged view of section VIII of FIG. 1.

The oil filter 30, which filters oil poured through the filler opening 5, comprises a cylindrically-shaped filter element 31 made of a nylon mesh, an outer frame 32 and an inner frame 33, and the filter element 31 is interposed between the outer frame 32 and inner frame 33. On the bottom portion of the filler opening 5, a downward projected ring portion 35 is integrally formed with the tank body 2. A ring-shaped member 36 is vibration welded to the downward projected ring portion 35. The oil filter 30 is supported, at the upper flange 32a of the outer frame 32, by the ring-shaped member 36. The welding of the ring portion 35 with the ring-shaped member 36 is performed as follows: as shown in FIG. 8, the ring portion 35 is fitted into a groove 38 which is formed on the top portion of the ring-shaped member 36; while a circular fusing area 39 formed on the bottom portion of the groove 38, indicated by a dotted line, is pressed against the end of the ring portion 35, then a horizontal vibration is applied so that a frictional heat develops, fusing the fusing area 39. In order to retain burrs generated in the process of vibration welding, a cavity 41 is formed between the inner circumference of the ring portion 35 and the groove 38. The ring portion 35 has a downward projected outer wall portion 37 which is fitted into a circular groove 40 inside the groove 38, in a manner that a minimum clearance δ required for vibration welding is allowed between the inner surface of the wall portion 37 and the inner wall of the groove 40. Such an arrangement prevents substantially a sideway shifting between the ring portion 35 and the ring-shaped member 36. The top face 39a of the fusing area 39 slopes down inwardly along radial direction in order to let burrs, generated in the course of welding operation, move into the cavity 41 positioned inside of the fusing area 39.

Disposed in the oil tank body 2 is an oil inlet chamber 51 which is enclosed by a portion of the side wall 2a of the tank body 2, a portion of the bottom wall 2b of the tank body 2, and the inner wall 50 of the tank body 2. The inner wall 50 is made up of the inner top wall 52 which is opposed to the bottom wall 2b of the tank body 2, and is made up of the inner side wall 53 which is opposed to the side wall 2a of the tank body 2.

Figure 3:
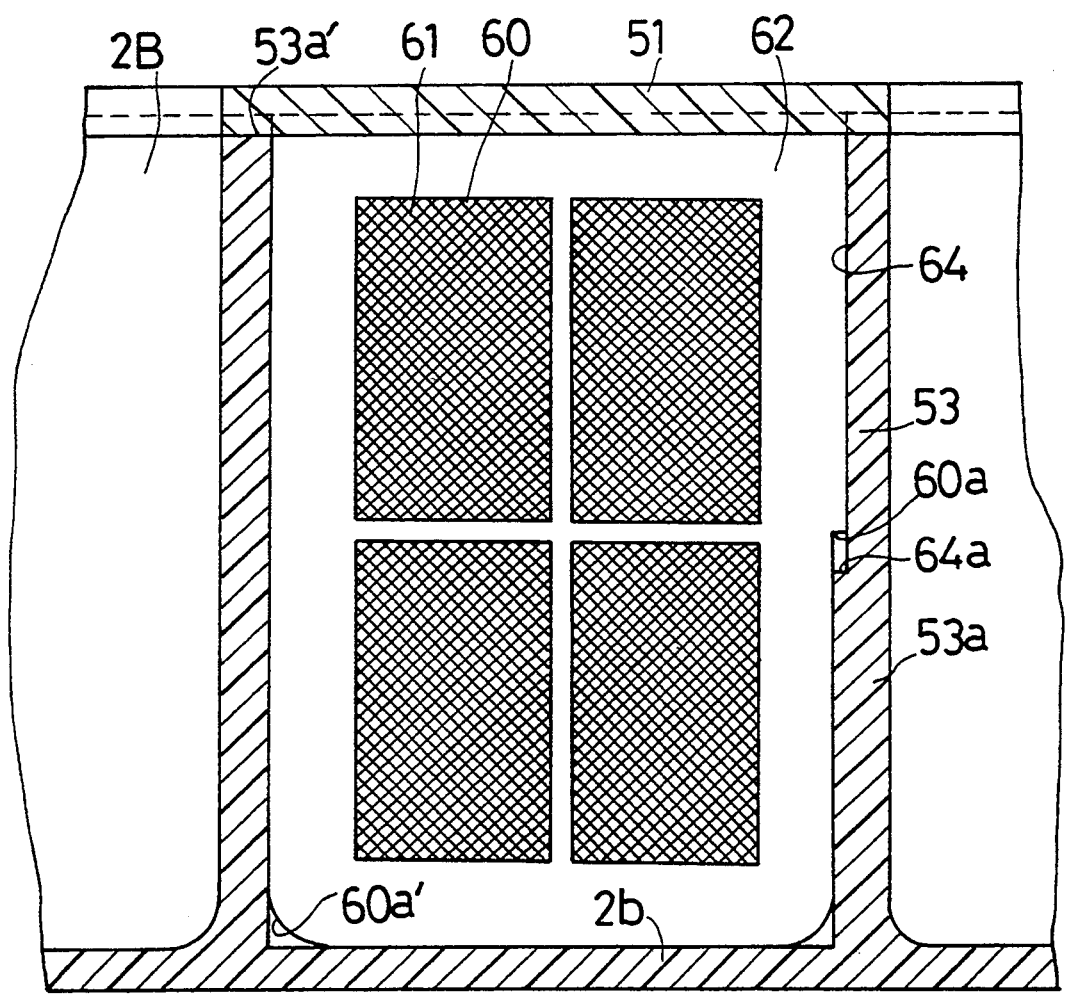
FIG. 3 is a cross-sectional view taken along the line III—III in FIG. 1.
Figure 4:
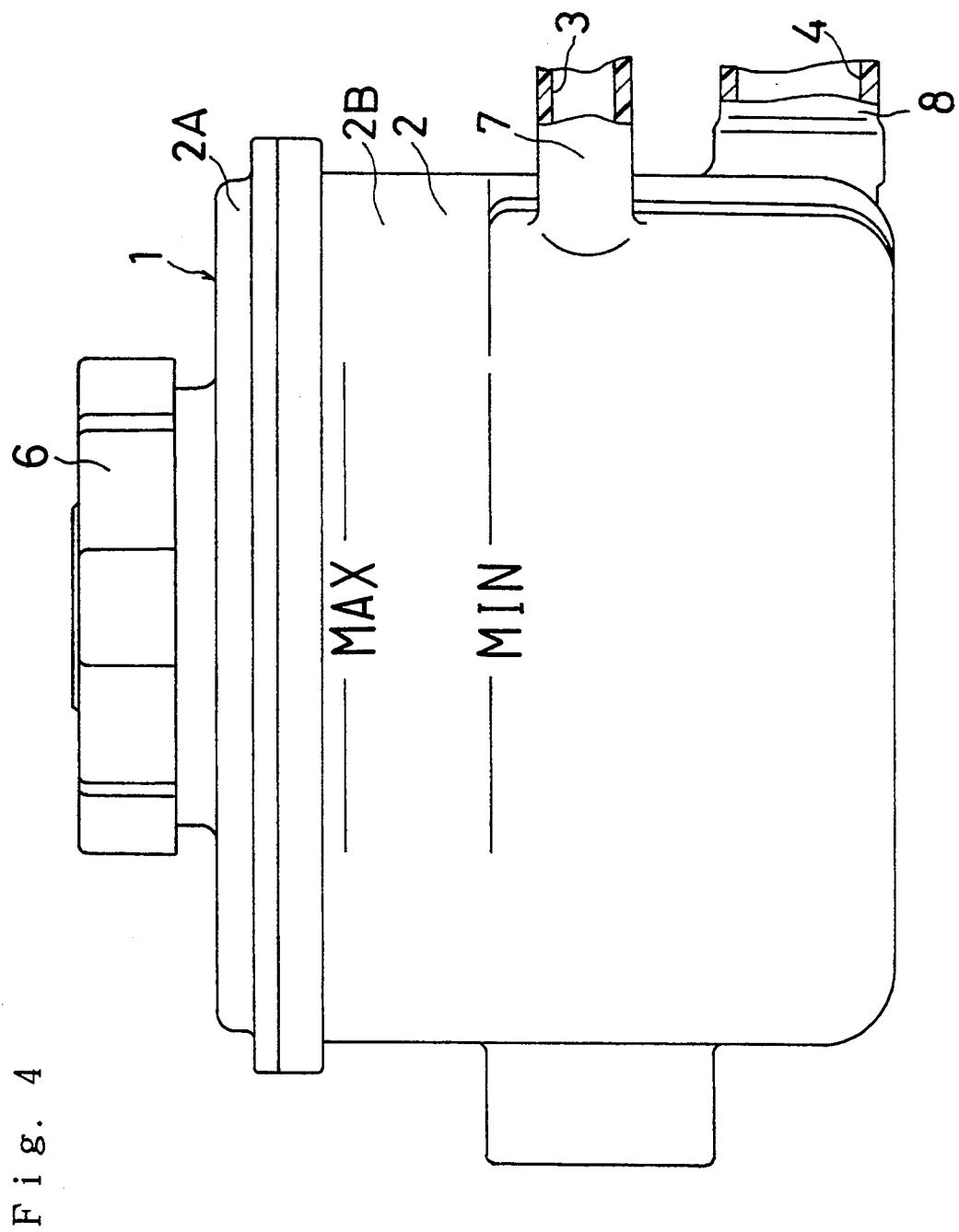
FIG. 4 is an front view showing an embodiment of the oil tank according to the present invention.

A portion of the inner side wall 53 is formed by said oil filter 60, and the remaining portion of the inner wall 53 is formed by a wall 53a which is integrated with the tank body 2. The oil filter 60 which has a flat shape comprises a filter element 61 made of synthetic resin mesh, a synthetic resin outer frame 62 and a synthetic resin inner frame 63, wherein the filter element 61 is interposed between the outer frame 62 and the inner frame 63. The oil filter 60 is inserted, from above, into a slot 64 formed on said wall 53a. As shown in FIG. 3, the oil filter 60 has a step 60a on its one side, and the slot 64 has a step 64a which is opposed to the step 60a. Thus, the oil filter 60 cannot be inserted into the slot 64 in an inside out manner. If so attempted, the step 60a of the oil filter 60 meets the top end portion 53a' of the wall 53a, and the step 64a of the slot 64 meets the bottom end 60a' of the oil filter 60. Such an arrangement assures that a projected portion 72 formed on the oil filter 60 is correctly fitted into a circular groove 70 formed on the underside of said top wall 52, and no unsatisfactory result takes place in the course of welding operation.

Figure 6:
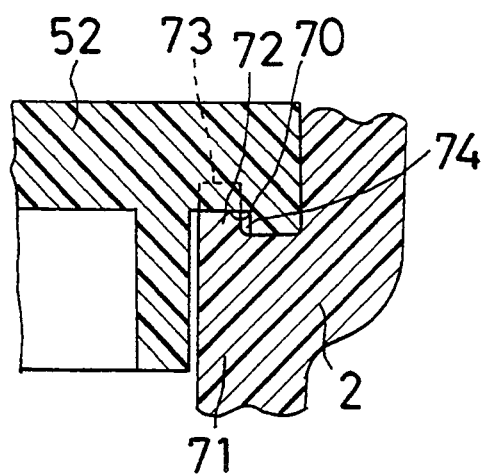
FIG. 6 is an enlarged view of section VI of FIG. 1.

The top wall 52, making up the oil inlet chamber 51, is made up of synthetic resin and is connected to both the tank body 2 and the inner side wall 53 by ultrasonic welding. The welding operation of the top wall 52 to the tank body 2 and the inner side wall 53 is performed as follows: as shown in FIG. 6, the circular projected portion 72 formed on the top of the inwardly projected thickened portion 71 of the tank body 2 and on the top of the inner side wall 53 is fitted into said groove 70 formed on the underside of the inner top wall 52; while a circular fusing area 73 formed on the circular projected portion 72, indicated by a dotted line, is pressed against the bottom of the groove 70, then a horizontal vibration is applied so that a frictional heat develops, fusing the fusing area 73. In order to retain burrs generated in the process of welding, a cavity 74 is formed between the outer circumference of the circular projected portion 72 and the groove 70. Since the outer circumference of the inner top wall 52 meets the inner surface of the tank body 2, the inner top wall 52 is prevented from shifting with respect to the tank body 2 and the inner side wall 53.

Integrally formed with the inner top wall 52 is a baffle 90 which is projected downward from the underside of the inner top wall 52. Oil streaming into the oil inlet chamber 51 through the inlet 3 is deflected by the baffle 90. Oil through the inlet 3, thus, cannot be routed directly against the filter element 61, and the filter element 61 is protected against a damage. Furthermore, the filter element 61 is free from any particular filtering point where oil flow is concentrated, and the clogging of the filter element 61 is thus prevented.

According to the arrangement mentioned above, the oil filter 60 constitutes a portion of the inner side wall 53 of the oil inlet chamber 51, thus the mesh area of the oil filter 60 may be set sufficiently large, independently of the diameter of the oil inlet 3. Oil flowing through the filter element 60 suffers less resistance, and the breakage or the accidental detachment of the oil filter 60 is avoided. The baffle 90 prevents oil coming in through the inlet 3 from directly streaming against the filter element 61, thereby effectively preventing the filter element 61 from damaging and clogging. The oil filter 60 has a flat shape, and its fabrication is easier and less costly, compared to the one whose shape is cylindrical. Alternatively, a curved oil filter 60 may be acceptable as long as it has substantially flat shape.

In the above embodiment, the pipe 8 making up the oil outlet 4 extends deep inside the tank body 2 and its opening end is placed almost near the center of the floor of the tank body 2. Such an arrangement keeps the opening end of the outlet 8 below an oil level in the tank body 2, even if the oil level is agitated or inclined in the tank body 2 when an vehicle is subjected to a sudden acceleration or deceleration, or sharp turning; thus, there is no chance of oil being mixed with air bubbles before it is output, no bubbles are introduced into the pump, and no malfunction takes place in the pump.

The present invention is not limited to the above embodiment. Alternatively, for example, the present invention may be constructed as detailed below. The same reference numerals are utilized to denote equivalent features in the following modifications, with no similar description repeated.

Figure 9:
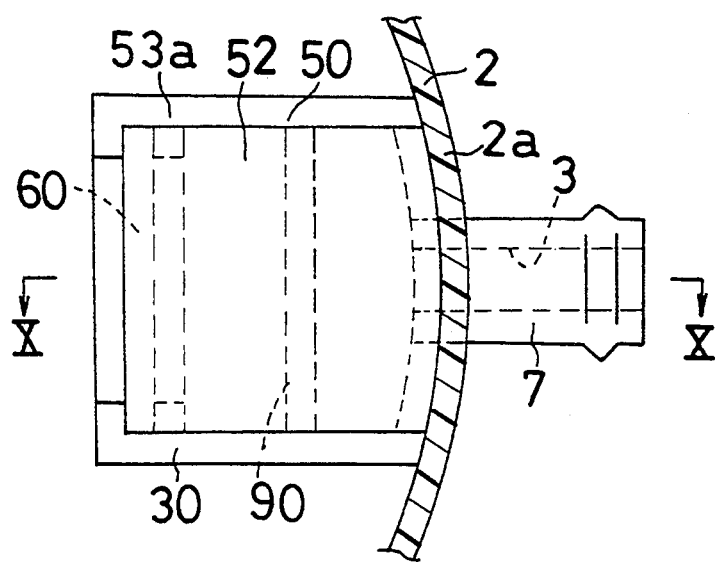
FIG. 9 is a horizontal cross-sectional view showing the major portion of another embodiment of the oil tank according to the present invention.
Figure 10:
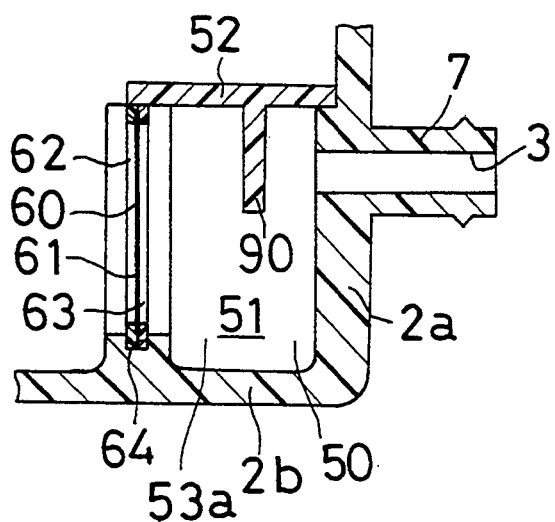
FIG. 10 is a cross-sectional view taken along the line X—X in FIG. 9.

As illustrated in FIG. 9 and FIG. 10, the baffle 90 may be extended entirely across the full width of the oil inlet chamber 51.

Figure 11:
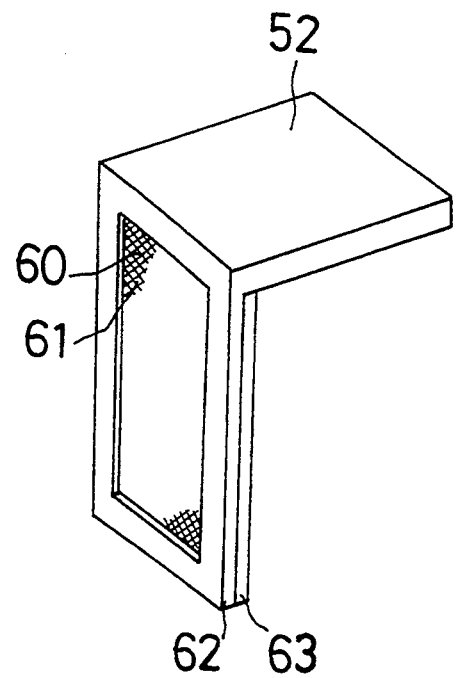
FIG. 11 is a perspective view of a modified embodiment of the oil filter according to the present invention.
Figure 12:
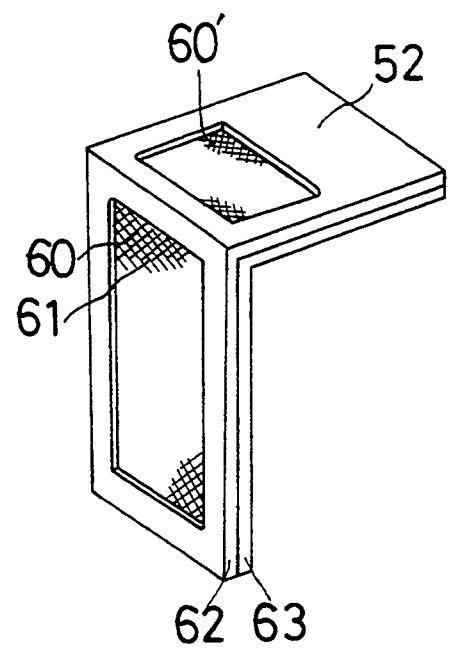
FIG. 12 is a perspective view of another modified embodiment of the oil filter according to the present invention.

As illustrated in FIG. 11 and FIG. 12, both the oil filter 60 and the inner top wall 52 may be integrally formed, and then, the oil filter 60, as a portion of the inner wall 50 of the oil inlet chamber 51, may be welded onto the tank body 2. In this case, a portion of the inner top wall 52 may be formed of an oil filter 60' as well, as illustrated in FIG. 12.

Figure 13:
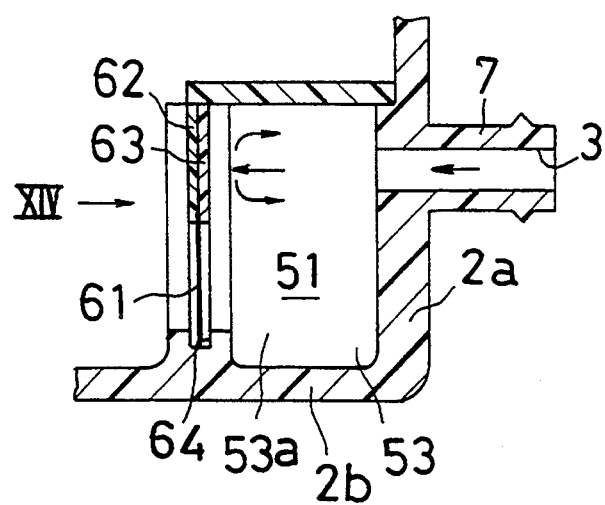
FIG. 13 is a cross-sectional view showing an another embodiment of an oil inlet chamber according to the present invention.
Figure 14:
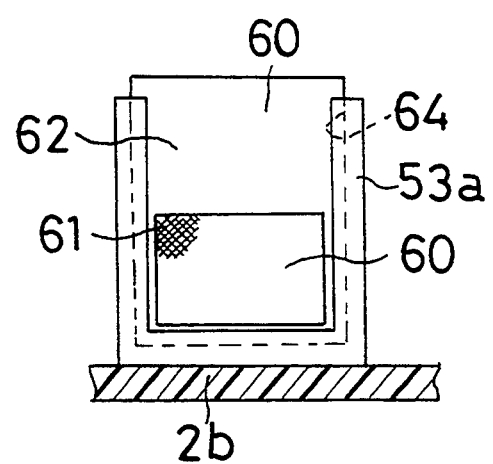
FIG. 14 is a view from the arrow XIV in FIG. 13.
Figure 15:
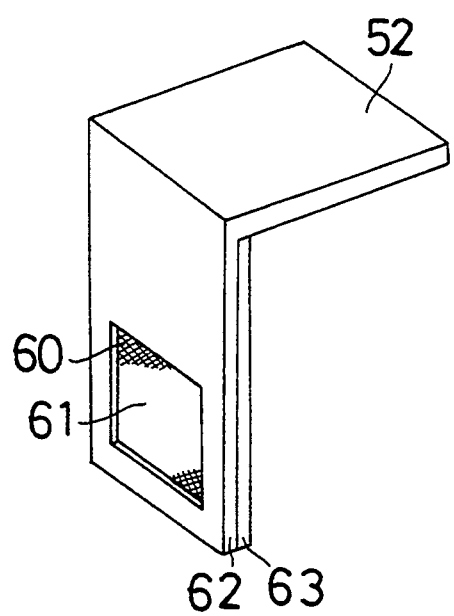
FIG. 15 is a perspective view of a modified embodiment of the oil filter according to the present invention.
Figure 16:
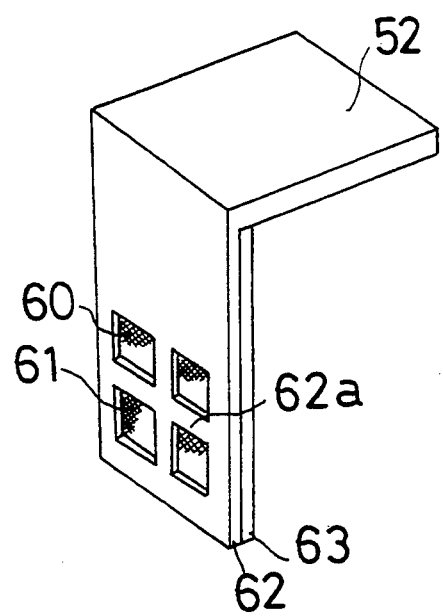
FIG. 16 is a perspective view of another modified embodiment of the oil filter according to the present invention.
Figure 17:
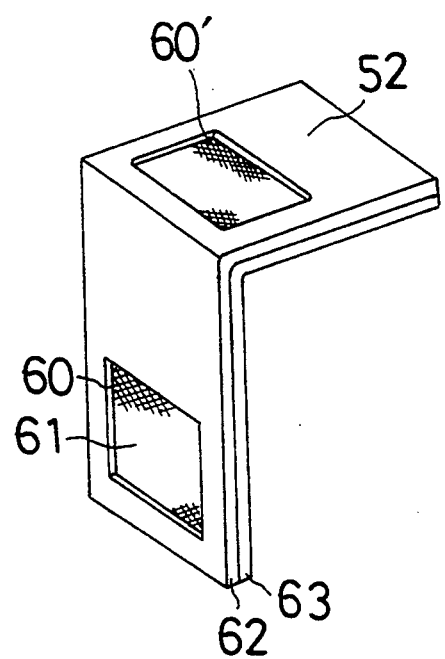
FIG. 17 is a perspective view of yet another modified embodiment of the oil filter according to the present invention.

As illustrated in FIG. 13 and FIG. 14, the filter element 61 made of a mesh is disposed below the level of the inlet 3, and the inner frame 63 checks the flow of oil streaming into the oil inlet chamber 51 through the oil inlet 3, which prevent the flow of oil meeting the filter element 61 directly. This arrangement effectively avoid the breakage or the clogging of the filter element 61 without the above mentioned baffle 90. In this case, both the oil filter 60 and the inner top wall 52 may be integrally formed as illustrated in FIG. 15, FIG. 16 and FIG. 17, then the oil filter 60, as a portion of the inner side wall 50 of the oil inlet chamber 51, may be welded to the tank body 2. As illustrated in FIG. 16, the oil filter element 61 may be partitioned by partitioning member 62a. Also, as illustrated in FIG. 17, a portion of the inner top wall 52 may be formed of an oil filter 60'.

Figure 18:
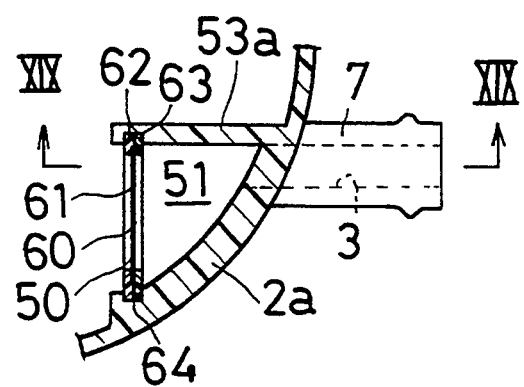
FIG. 18 is a transverse cross-sectional view showing the major portion of another embodiment of the oil tank according to the present invention.
Figure 19:
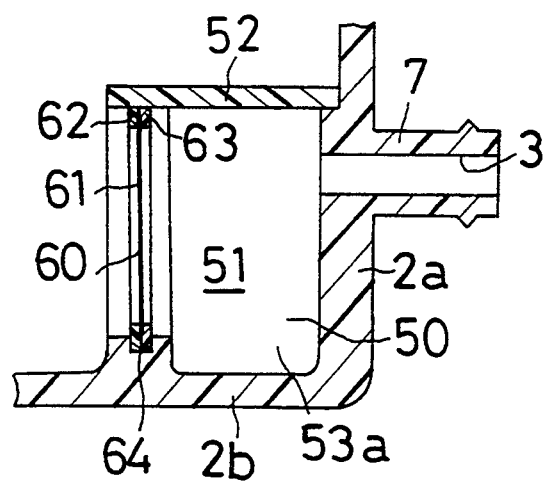
FIG. 19 is a cross-sectional view taken along the line XIX—XIX in FIG. 18.

As illustrated in FIG. 18 and FIG. 19, the baffle 90 may be eliminated such that the flow of oil through the inlet 3 meets the filter element 61 directly.

Figure 20:
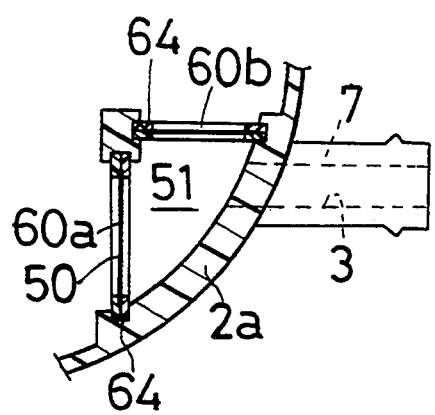
FIG. 20 is a transverse cross-sectional view showing the major portion of yet another embodiment of the oil tank according to the present invention.

Portions of the inner side wall 53 may be made of two oil filters 60a, 60b, both of which are disposed at right angles when viewed from above, as illustrated in FIG. 20.

Figure 21:
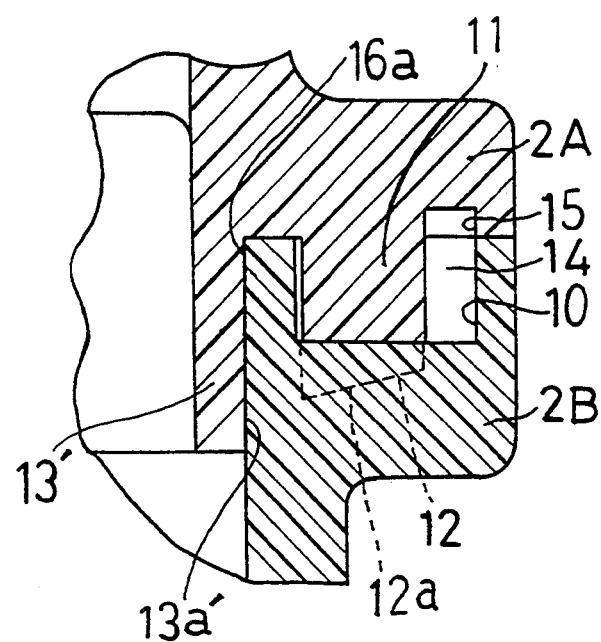
FIG. 21 is a cross-sectional view showing the welding structure of a modified embodiment according to the present invention.
Figure 22:
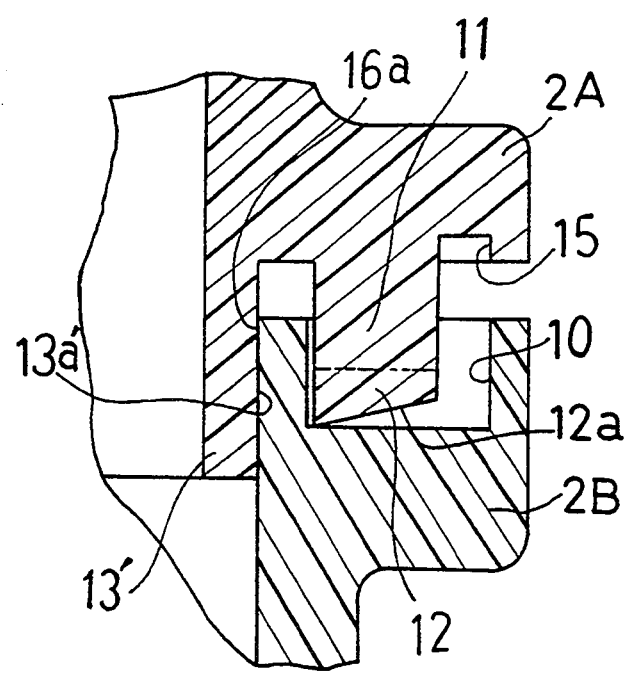
FIG. 22 is a cross-sectional view showing the welding structure of the modified embodiment of FIG. 21 before welding.

In the previously described embodiments, to form the tank body 2 both the upper member 2A and the lower member 2B are connected with each other by vibration welding. Alternatively, both members may be connected by ultrasonic welding. As shown in FIG. 21, the inner wall of the upper member 2A is extended downward to form a circular inner wall portion 13', which is fitted with the top portion of the lower member 2B. Since the outer circumference 13a' of the circular portion 13' is interfaced with the inner circumference 16a of the lower member 2B, a relative sideway shifting between the upper member 2A and the lower member 2B is substantially avoided. In other words, the upper member 2A is connected to the lower member 2B by spigot fitting. As shown in FIG. 22, before welding, disposed outside the spigot fit portion is a circular fusing area 12 which is integrally formed with a projected ring portion 11 formed on the bottom end of the upper member 2A. While the fusing area 12 is pressed against the bottom of a the circular groove 10 formed on the top rim of the lower member 2B, a vertical oscillating ultrasonic vibration is applied to both members 2A, 2B; and a frictional heat develops, fusing the fusing area 12, and the upper member 2A is welded to the lower member 2B as shown in FIG. 21. A circular cavity 14 is formed immediately outside the welding area in order to receive burrs resulting from the fusion of the fusing area 12. The cavity 14 is a space enclosed by the outer circumference of the projected ring portion 11, the circular groove 10 and the circular groove 15 formed on the bottom rim of the upper member 2A. The bottom face 12a of the circular fusing area 12 slopes up outwardly along radial direction in order to let burrs, generated in the course of welding operation, move into the cavity 14 positioned outside of the fusing area 12. Thus, a relative sideway shifting between the upper member 2A and the lower member 2B is avoided. A tight fitting performed between the upper member 2A and the lower member 2B prevents burrs generated in the course of welding from moving inwardly into the tank body 2. Furthermore, the circular cavity 14 works in a manner that the inward movement of burrs is restricted.

Figure 23:
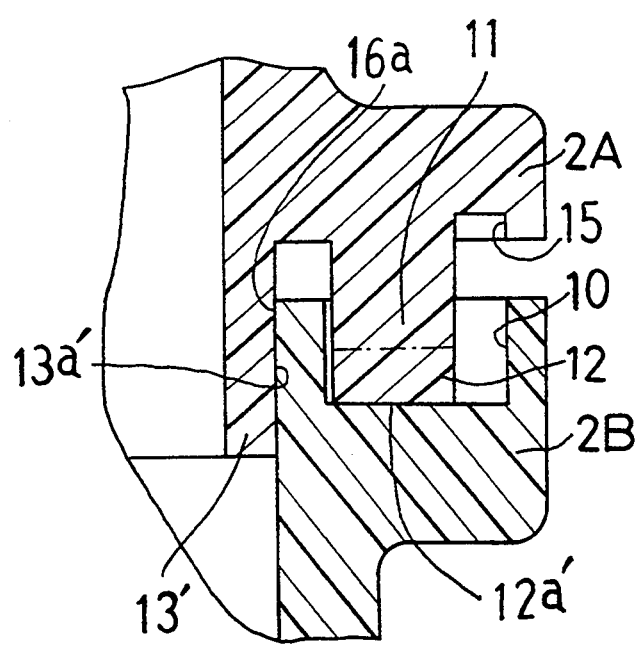
FIG. 23 is a cross-sectional view showing the welding structure of another modified embodiment according to the present invention before welding.

In the above embodiment and modifications to it, the bottom face 12a of the fusing area 12 is inclined to facilitate the burr movement toward the cavity. Alternatively, the fusing area 12 may have a flat bottom surface 12a' as shown in FIG. 23. Also, alternatively, the circular groove 10 may be formed on the upper member 2A rather than the lower member 2B, In this case, the projected ring portion 11 should be formed on the lower member 2B. Furthermore, the fusing area 12 may be formed on the lower member 2B, or formed on both the upper and lower members 2A, 2B.

Figure 24:
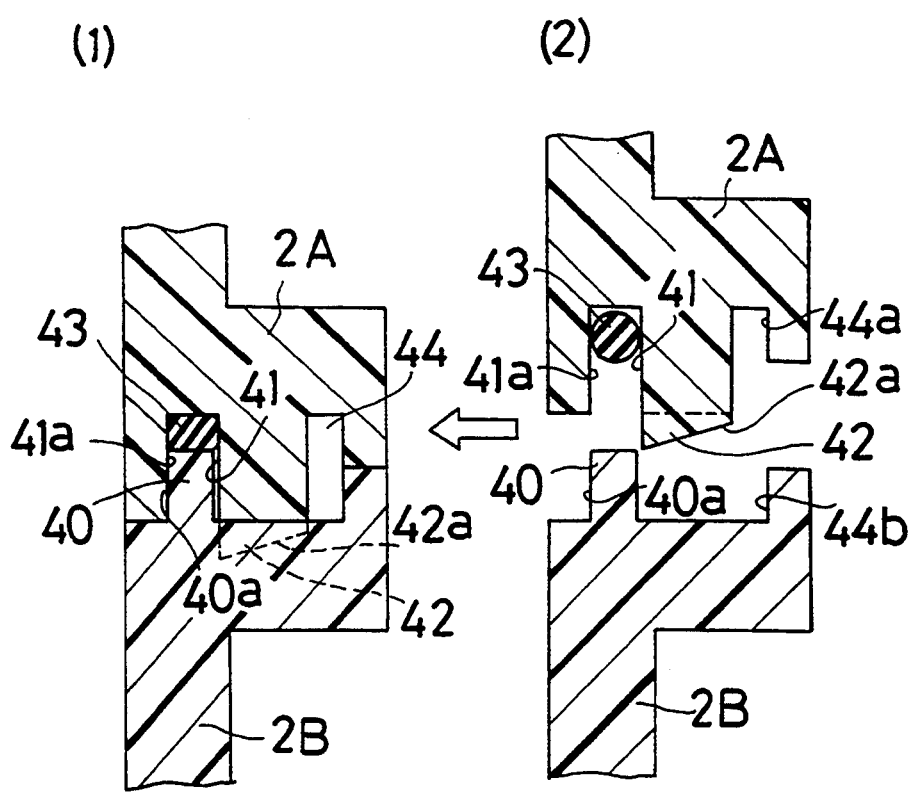
FIG. 24 is cross-sectional view showing welding structure of a modified embodiment according to the present invention.

FIG. 24 shows a modification incorporated in the welding structure in which an upper member 2A and a lower member 2B are connected with each other to be a tank body using ultrasonic welding. FIG. 24(1) is an illustration of the welding structure after welding. FIG. 24(2) is an illustration of the welding structure before welding. The rim of the lower member 2B has a circular upwardly projected portion 40 which is fitted into a circular groove 41 formed on the lower end rim of the upper member 2A. Since the inner circumference 40a of the circular projected portion 40 interfaces with the inner vertical wall 41a of the circular groove 41, a relative sideway shifting between the upper member 2A and the lower member 2B is prevented. In other words, the upper member 2A is connected to the lower member 2B using spigot fitting. Disposed outside the spigot fit portion a circular fusing area 42 which is integrally formed with the lower end rim of the upper member 2A as shown in FIG. 24(2). An O-ring 43 is provided into the circular groove 41. The fusing area 42 is fused by a frictional heat as a result of a vertically oscillating ultrasonic vibration, and the upper member 2A is welded to the lower member 2B as shown in FIG. 24(1). Compressed between the upper member 2A and the lower member 2B, the O-ring 43 improves the sealing between the upper member 2A and the lower member 2B. Disposed immediately outside the welding area, a circular cavity 44 is formed in order to retain burrs resulting from the fusion of the fusing area 42. The cavity 44 is a space enclosed by a circular groove 44a formed on the lower end rim of the upper member 2A, and a portion of the circular groove 44b formed on the rim of the lower member 2B. The bottom face 42a of the circular fusing area 42 slopes up outwardly along radial direction in order to let burrs, generated in the course of welding operation, move into the cavity 44.

Figure 25:
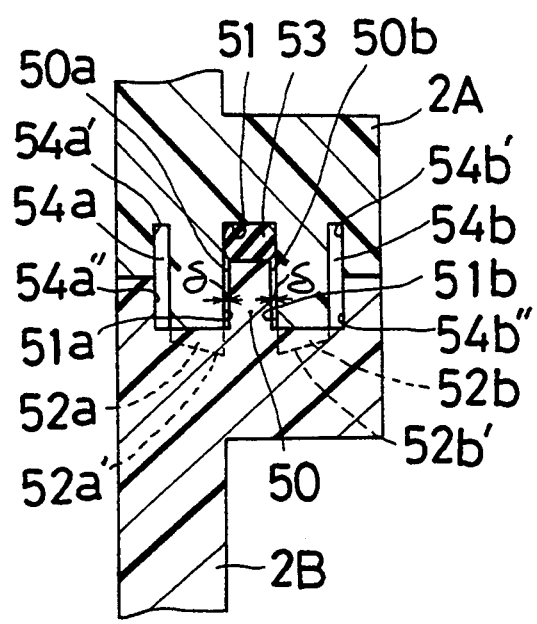
FIG. 25 is a cross-sectional view showing the welding structure of another modified embodiment according to the present invention.

FIG. 25 shows a modification, incorporated in the welding structure, wherein the upper member 2A is connected to the lower member 2B using ultrasonic welding. The lower member 2B has an upwardly circular projected portion 50, which is fitted into a circular groove 51 formed on the lower end rim of the upper member 2A. Since a clearance δ between the circumferences 50a, 50b of the circular portion 50 and the circumferences 51a, 51b of the groove 51 is kept to a minimum, a relative sideway shifting between the upper member 2A and the lower member 2B is substantially avoided. Disposed both inside and outside this fit portion are respectively circular fusing areas 52a, 52b which are integrally formed to the lower rim end of the upper member 2A, as shown by dotted lines in FIG. 25. An O-ring 53 is provided into the groove 51. The upper member 2A is welded to the lower member 2B fusing the fusing areas 52a, 52b with a frictional heat developed by a vertically oscillating ultrasonic vibration applied. Compressed between the upper member 2A and the lower member 2B, the O-ring 53 improves the sealing between the upper member 2A and the lower member 2B. Circular cavities 54a, 54b are formed, respectively inside and outside the welding areas, in order to retain burrs developed by the fusion of the fusing areas 52a, 52b. The cavity 54a is a space enclosed by a circular groove 54a' formed on the rim of the upper member 2A and a circular groove 54a" formed on the rim of the lower member 2B. The cavity 54b is a space enclosed by a circular groove 54b' formed on the rim of the upper member 2A and a circular groove 54b" formed on the lower member 2B. The bottom face 52a' of the circular fusing area 52a slopes up inwardly along radial direction in order to let burrs, generated in the course of welding operation, move into the cavity 54a. The bottom face 52b' of the circular fusing area 52b slopes up outwardly along radial direction in order to let the burrs move into the cavity 54b.

Figure 26:
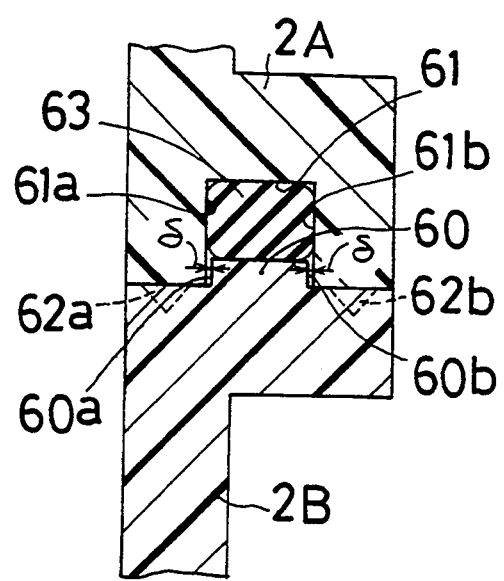
FIG. 26 is a cross-sectional view showing the welding structure of yet another modified embodiment according to the present invention.

FIG. 26 shows a modification, incorporated in the welding structure, wherein the upper member 2A is connected to the lower member 2B using ultrasonic welding. The lower member 2B has a circular projected portion 60, which is fitted into a circular groove 61 formed on the lower end rim of the upper member 2A. Since a clearance δ between the circumferences 60a, 60b of the projected portion 60 and the circumferences 61a, 61b of the groove 61 is kept to a minimum, a relative sideway shifting between the upper member 2A and the lower member 2B is substantially avoided. Disposed both inside and outside this fit portion are respectively circular fusing areas 62a, 62b which are integrally formed to the lower rim end of the upper member 2A, as shown by dotted lines in FIG. 26. An O-ring 63 is provided into the groove 61. The upper member 2A is welded to the lower member 2B by fusing the fusing areas 62a, 62b with a frictional heat developed by a vertically oscillating ultrasonic applied. Compressed between the upper member 2A and the lower member 2B, the O-ring 63 improves the sealing between the upper member 2A and the lower member 2B.

Figure 27:
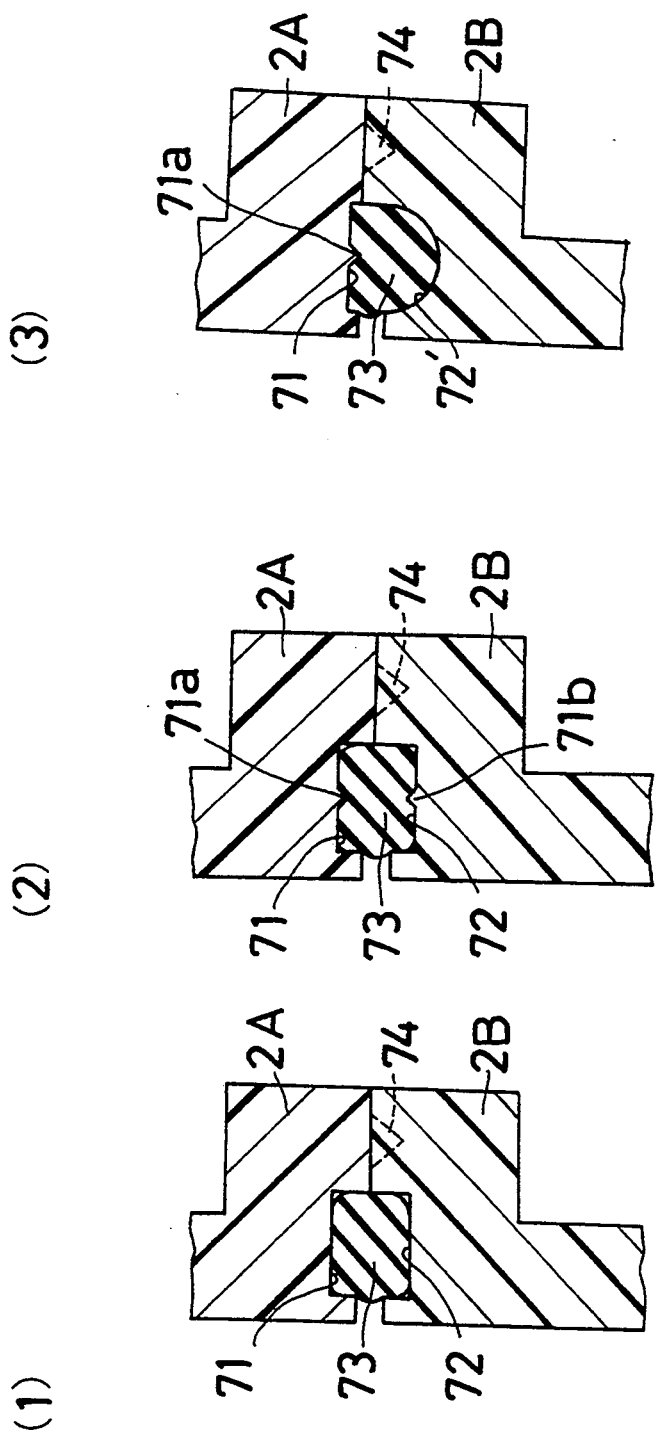
FIG. 27 is a cross-sectional view showing the welding structure of yet another modified embodiment according to the present invention.
Figure 28:
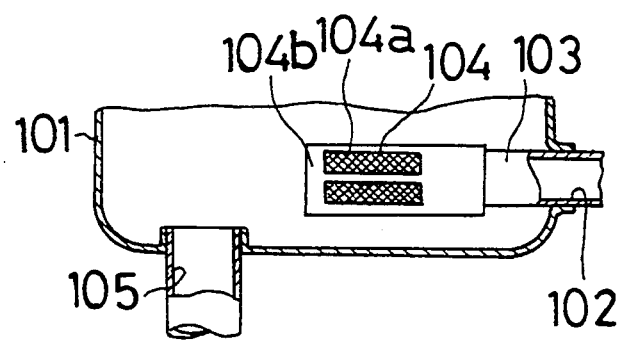
FIG. 28 is a cross-sectional view showing a portion of a conventional oil tank.
Figure 29:
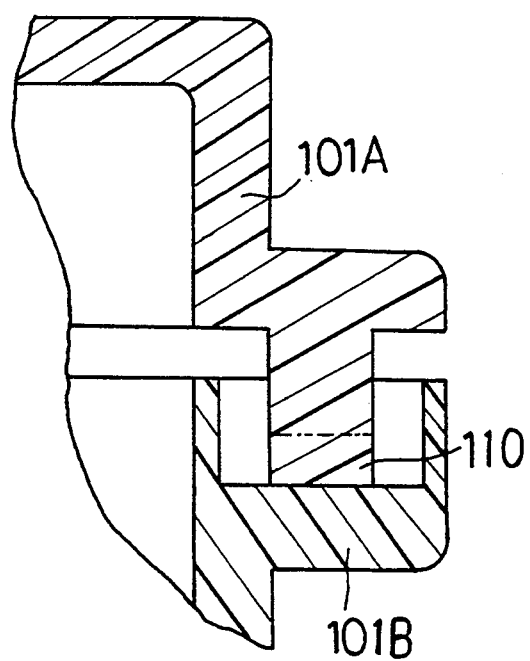
FIG. 29 is a cross-sectional view showing the welding structure of the conventional oil tank in its prior welding state.
Figure 30:
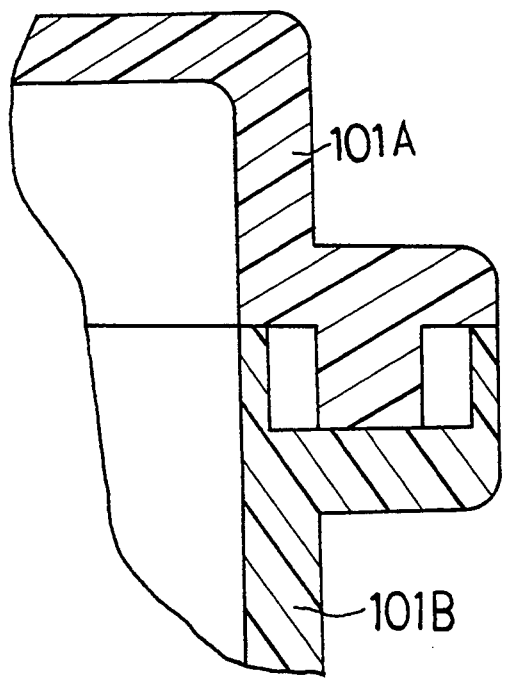
FIG. 30 is a cross-sectional view showing the welding structure of the conventional oil tank after welding.

FIG. 27 shows a modification, incorporated in the welding structure wherein the upper member 2A is connected to the lower member 2B to be the tank body using ultrasonic welding. The welding structure illustrated in FIG. 27(1) has a groove 71 on the upper member and a groove 72 on the lower member, with an O-ring 73 placed between the groove 71 and the groove 72. A circular fusing area 74, as shown by a dotted line, is integrally formed with the rim of the upper member 2A outside the O-ring 73 before welding operation. The fusing area 74 is fused by a frictional heat developed by a vertically oscillating ultrasonic vibration. Compressed between the upper and lower members, the O-ring 73 improves the sealing between the upper and lower members. The modification illustrated in FIG. 27(2) differs from the modification illustrated in FIG. 27(1) in that the modification in FIG. 27(2) has, in the grooves 71, 72, respectively circular projections 71a, 72a which are integrally formed with the upper and lower members 2A, 2B. The projections 71, 72 allow the O-ring 73 to develop a larger localized compressive stress, and the sealing between the upper member and the lower member is improved. The modification illustrated in FIG. 27(3) differs from the modification in FIG. 27(1) in that the modification in FIG. 27(3) has, in the groove 71, a circular projection 71a which is integrally formed with the upper member 2A. Since the projection 71a allows the O-ring 73 to develop a larger localized compressive stress, and the shape of the groove 72' of the lower member 2B is configured so that it fits well with the O-ring 73, the sealing between the upper and lower members is even more improved. The sealing member employed between the upper and lower members is not limited to a O-ring.

What is claimed is:

1. An oil tank comprising:

an oil tank body having a bottom wall, a top wall, a side wall integral with and extending upwardly from said bottom wall, and an inner wall integral with and extending upwardly from said bottom wall and spaced from said side wall;

said inner wall having an inner top wall spaced from said bottom wall, and an inner side wall spaced from said side wall with said inner side wall having an upwardly opening slot therein and a solid portion and said top wall having a filler opening therethrough;

an oil inlet chamber enclosed by said inner top wall, said inner side wall, a portion of said side wall and a portion of said bottom wall, and an oil storage chamber being formed outside of said oil inlet chamber and within said oil tank body;

a first oil filter having a substantially flat shape, forming a portion of said inner side wall, and extending downwardly into said slot;

an oil inlet passage having a central axis and passing into said oil inlet chamber, for allowing oil into said oil tank body;

an oil outlet passage having a central axis and passing into said oil storage chamber, for allowing oil to exit from said oil tank body; and a second oil filter provided in said oil storage chamber and located between said filler opening and said oil outlet passage.

2. The oil tank according to claim 1, wherein:

a portion of a wall extends into said oil inlet chamber and forms a baffle positioned to intersect a line coinciding with the central axis of said oil inlet passage.

3. The oil tank according to claim 1, wherein:

said solid portion of said inner side wall is positioned to intersect a line coinciding with the central axis of said oil inlet passage.

4. The oil tank according to claim 1 wherein said oil tank body comprises an upper member and a lower member which are joined together by welding;

said side wall extending from said lower member to said upper member;

said side wall of said lower member having a radially inwardly projecting thickened portion with an axially extending lip;

said inner top wall having an axially extending groove that engages with said lip, and said inner top wall being joined with said lower member side wall and said inner side wall by friction welding.

5. An oil tank comprising:

an oil tank body having a bottom wall, a top wall, a side wall and an inner wall, said top wall having a filler opening therethrough;

said oil tank body comprising a synthetic resin upper member having a first axially extending annular rim and a synthetic resin lower member having a second axially extending annular rim;

an oil inlet chamber enclosed by a portion of said bottom wall, a portion of said side wall, and said inner wall, and an oil storage chamber being formed outside of said oil inlet chamber and within said oil tank body;

a first oil filter having a substantially flat shape, and forming a portion of said inner wall;

an oil inlet passage having a central axis and passing into said oil inlet chamber, for allowing oil into said oil tank body;

an oil outlet passage having a central axis and passing into said oil storage chamber, for allowing oil to exit from said oil tank body;

a circumferential surface of said first annular rim positioned adjacent and concentric to a circumferential surface of said second annular rim with a radial clearance between said circumferential surfaces;

said radial clearance being large enough to allow friction welding of said upper member to said lower member by relative vibration of said upper and lower members, but small enough to prevent substantial radial movement between said upper and lower members;

an annular contact area between said upper and lower members extending in a radial direction from said circumferential surfaces; and a second oil filter provided in said oil storage chamber and located between said filler opening and said outlet passage.

6. The oil tank according to claim 5, wherein an annular cavity is formed between said upper and lower members adjacent said annular contact area.

7. The oil tank according to claim 6, wherein an annular sealing member is interposed between said upper and lower members.

8. The oil tank according to claim 6, wherein said annular contact area is located radially outwardly from said upper and lower member circumferential surfaces, and said annular cavity is located radially outwardly from said annular contact area.

9. The oil tank according to claim 8, wherein an annular sealing member is interposed between said upper and lower members.

* * * * *